United States Patent [19]

Smith

[11] 4,370,711

[45] Jan. 25, 1983

[54] BRANCH PREDICTOR USING RANDOM ACCESS MEMORY

[75] Inventor: James E. Smith, Forest Lake, Minn.

[73] Assignee: Control Data Corporation, Minneapolis, Minn.

[21] Appl. No.: 198,990

[22] Filed: Oct. 21, 1980

[51] Int. Cl.³ .............................................. G06F 9/42
[52] U.S. Cl. .................................................. 364/200
[58] Field of Search ... 364/200 MS File, 900 MS File

[56] References Cited

U.S. PATENT DOCUMENTS 4,124,893  11/1978  Joyce et al. ........................ 364/200
4,176,394  11/1979  Kaminski et al. ................... 364/200

Primary Examiner—Raulfe B. Zache
Attorney, Agent, or Firm—William J. McGinnis; Joseph A. Genovese

[57] ABSTRACT

A system is provided for predicting in advance the result of a conditional branch instruction in a computer system. The system includes a hash mechanism, a random access memory, an address buffer, a branch outcome result receiving means and a counter buffer. The hash mechanism and memory use the input branch instruction address to produce a count which in effect is a way of weighting recent branch history to predict the branch decision. The counts are stored in the random access memory (RAM). The random access memory is addressed by the hashed branch instruction address to produce the system result.

5 Claims, 2 Drawing Figures

BRANCH PREDICTOR USING RANDOM ACCESS MEMORY

BACKGROUND OF THE INVENTION

This invention relates to the branch prediction mechanism for handling conditional branch instructions in a computer system. When a branch instruction is encountered, it is wasteful of the computer resource to wait for resolution of the instruction before proceeding with the next programming step. Therefore, it is a known advantage to provide a prediction mechanism to predict in advance the instruction to be taken as a result of the conditional branch. If this prediction is successful, it allows the computer system to function without a delay in processing time. There is a time penalty if the prediction is incorrect. Therefore, an object of the present invention is to provide an improved branch prediction mechanism with a high prediction accuracy to minimize the time loss caused by incorrect predictions.

In computer systems, branch prediction mechanisms which accurately predict the outcome of a conditional branch instruction, before the branch instruction is executed, are used to guide prefetching of instructions or the conditional issue of instructions. The prediction need not always be correct, but an incorrect prediction typically results in a significant time penalty when instructions along the correct path are fetched and/or conditionally issued instructions on the incorrect path are cancelled.

Prior art prediction techniques are numerous. One such technique is to predict that all branches are taken. Another more sophisticated prior art technique of branch prediction is to maintain a table of the addresses of the most recently taken branch instructions. This typically can consist of an associative memory of four to eight entries. Obviously, this prior art technique could be expanded to include more entries. When a branch instruction is encountered, if its address appears in the table, it is predicted to be taken. If the address does not appear, then the prediction is not taken.

SUMMARY OF THE INVENTION

Throughout this application, the following meaning is used: branch instructions test a condition specified by the instruction. If the condition is true, then the branch is taken, that is, instruction execution begins at the new address specified by the instruction. If the condition is false, the branch is not taken and instruction execution continues with the instruction sequentially following the branch instruction.

The principle upon which the present invention is based is that a conditional branch instruction is likely to be decided in the same way as on the instruction's most recent executions. The principle is somewhat similar to the prior art, however, the mechanism represents a considerable improvement from the prior art. A direct access, random access memory (RAM) having, for example, 16 entries, each containing a two bit count (+1, 0, −1, −2) is used. A has mechanism will reduce in length or hash the address of the branch instruction to four bits and read out the memory contents addressed by these four bits. If the sign bit in the memory is 0, (i.e. +1 or 0 is read) then the strategy is to predict the branch to be taken, otherwise the prediction is that the branch is not taken. After the branch is executed, if it is taken, the count memory entry is incremented up to a limit of +1. After the branch is executed, if it is not taken, the count memory address is decremented down to a limit of −2.

Thus, the present invention uses a random access memory to hold a count which is continuously adjusted as a result of recent branch outcomes. A hash mechanism which may be as simple as taking the last four bits of an address may be applied to an instruction address which may have as many as 64 bits to produce a hashed address for the random access memory. When the outcome of the branch instruction is known, the increment-decrement unit can adjust the count contained at the hash address in the random access memory.

IN THE FIGURES

DESCRIPTION OF THE PREFERRED EMBODIMENTS

Theory of Operation

Figure 1:
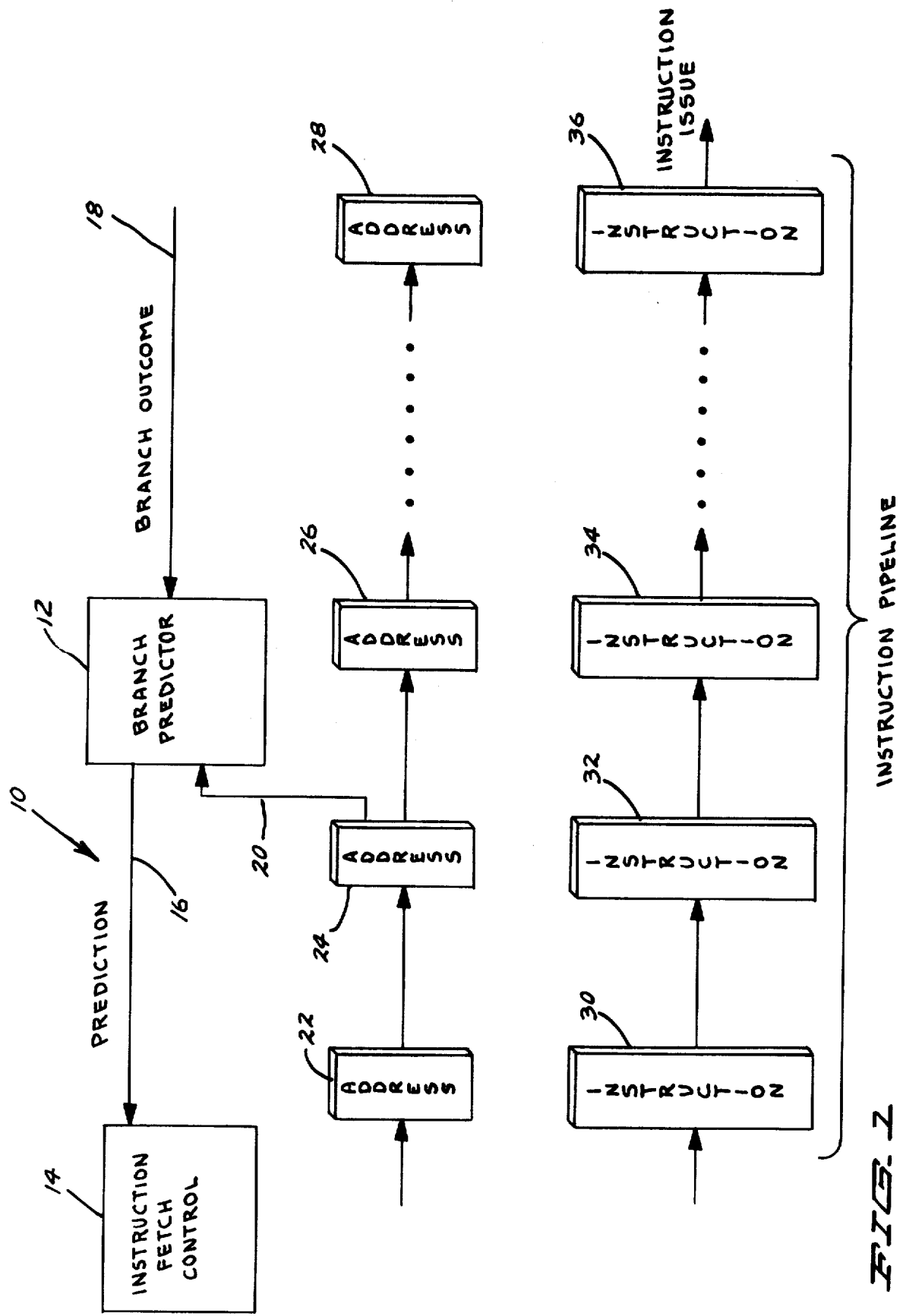
FIG. 1 is a diagrammatic showing of a computer instruction pipeline showing a branch prediction mechanism according to the present invention.

A branch instruction address to be predicted may contain any number of bits in theory. The present invention is not to be limited in scope to any address length. Therefore, let the address bits of the branch instruction to be predicted be labeled as:

$$a_{m-1}, a_{m-2}, \ldots a_2, a_1, a_0$$

where $a_0$ is the least significant bit and $a_{m-1}$ is the most significant bit.

In the first operation according to the present invention, the m address bits are reduced or hashed to n bits. The exact manner in which this reduction is done is not critical, as long as m bit addresses which are close to each other tend to be reduced to different n bit addresses. Many methods of accomplishing this may be employed which will work. The preferred method as described in connection with the present invention is quite simple. The least significant bits of the branch instruction address are used as the n bit address. More particularly, let the n bit address be described as $$b_{n-1}, b_{n-2}, \ldots b_2, b_1, b_0. \text{ Then, } b_{n-1} = a_{n-1},$$
$$b_{n-2} = a_{n-2}, \ldots b_2 = a_2, b_1 = a_1, b_0 = a_0.$$

The counts stored in the random access memory at the hash address must be initialized at some value. For purposes of this invention, it has been found that an initial value of 0 appears to be satisfactory. Thus, when it is known that a branch is taken, the count that is addressed in the RAM is incremented unless it reaches a predetermined value of +q, in which case the count is left at +q. If the branch is not taken, the count which is addressed in the RAM is decremented unless it is already a predetermined quantity −p, in which case the count is left at −p.

Other features of the implementation would be that a 2's complement representation for the count is used. Then, the sign bit of the count is all that is needed to make the branch prediction. Initializing the counts for each address at 0 results in branches being predicted as taken the first time the count is accessed by the hash address. Initializing the counts at −1 would result in branches first being predicted as not taken. The best results are obtained in the preferred embodiment of the invention if relatively small values of p and q are used. For example, −p equal to −2 and +q equal to +1 result in two bit counters if a 2's complement representation is used. If a 1 bit count is used, this method degenerates into having a bit that is 1 when the most recent branch mapping to the count was not taken and 0 if the most recent branch was taken. Because of the reduction of the branch instruction address from m bits to n bits, more than 1 instruction can access the same count and there is, therefore, a collision. For this reason, the count memory should be designed to have more words than the number of branch instructions that are likely to be active at any given time. However, even when collisions in the memory do occur, the count mechanism tends to smooth out any deleterious effects.

The use of a random access memory rather than, for example, an associative memory avoids the use of an associative table lookup scheme to compare the branch address with each entry in the table. The use of the random access memory has the advantage that each memory word contains a count, not an address, so each entry is therefore much shorter. Thus, many more memory words can be used and in general, the histories of many more branch instructions can be recorded than with an associative lookup table. Thus, the present invention has the advantage of using less and simpler hardware than another technique might have.

Using a stored count to record past history has two advantages. First, the count captures more of the recent branch history than the most recent execution. If a branch is nearly always taken, for example, when it terminates a loop of instructions, than an anomalous not taken decision results in two wrong pedictions if only the result of the most recent branch execution is used to make a prediction. The first wrong prediction would be when the branch is anomalously not taken, and the second when it is subsequently taken. Using at least a two bit count results in only one incorrect prediction in this situation.

The second advantage of using a count becomes apparent when more than one branch instruction addresses the same location in the count memory. When this happens, a count tends to result in a "vote" among the the branch instructions mapping to the same location, and predictions are made according to the way a "majority" of the more recent decisions were made. This tends to cause a relatively high prediction accuracy, although not as high as if there were no collisions.

DESCRIPTION OF THE SYSTEM ACCORDING TO THE PRESENT INVENTION

Referring now to FIG. 1, a computer instruction pipeline 10 contains a branch prediction mechanism 12 according to the present invention. An instruction fetch control 14 receives the output of the prediction from the branch predictor 12 to determine which instruction is to be fetched. The branch predictor receives as an input a signal on control line 18 to indicate whether or not the previous branch instruction was taken or not. That is, the outcome of the previous branch is provided as a return to the branch predictor 12 on line 18. The branch predictor receives an input instruction address on line 20 from address register 24 in the address pipeline. The address pipeline may contain registers 22, 24, 26 and so forth to a final register 28. The intent of FIG. 1 is to show that the branch prediction mechanism should be placed in the instruction pipeline at an early position. Related to each address register, is an associated instruction register 30, 32, 34 and a final instruction register 36 which is the instruction ready to be issued.

Figure 2:
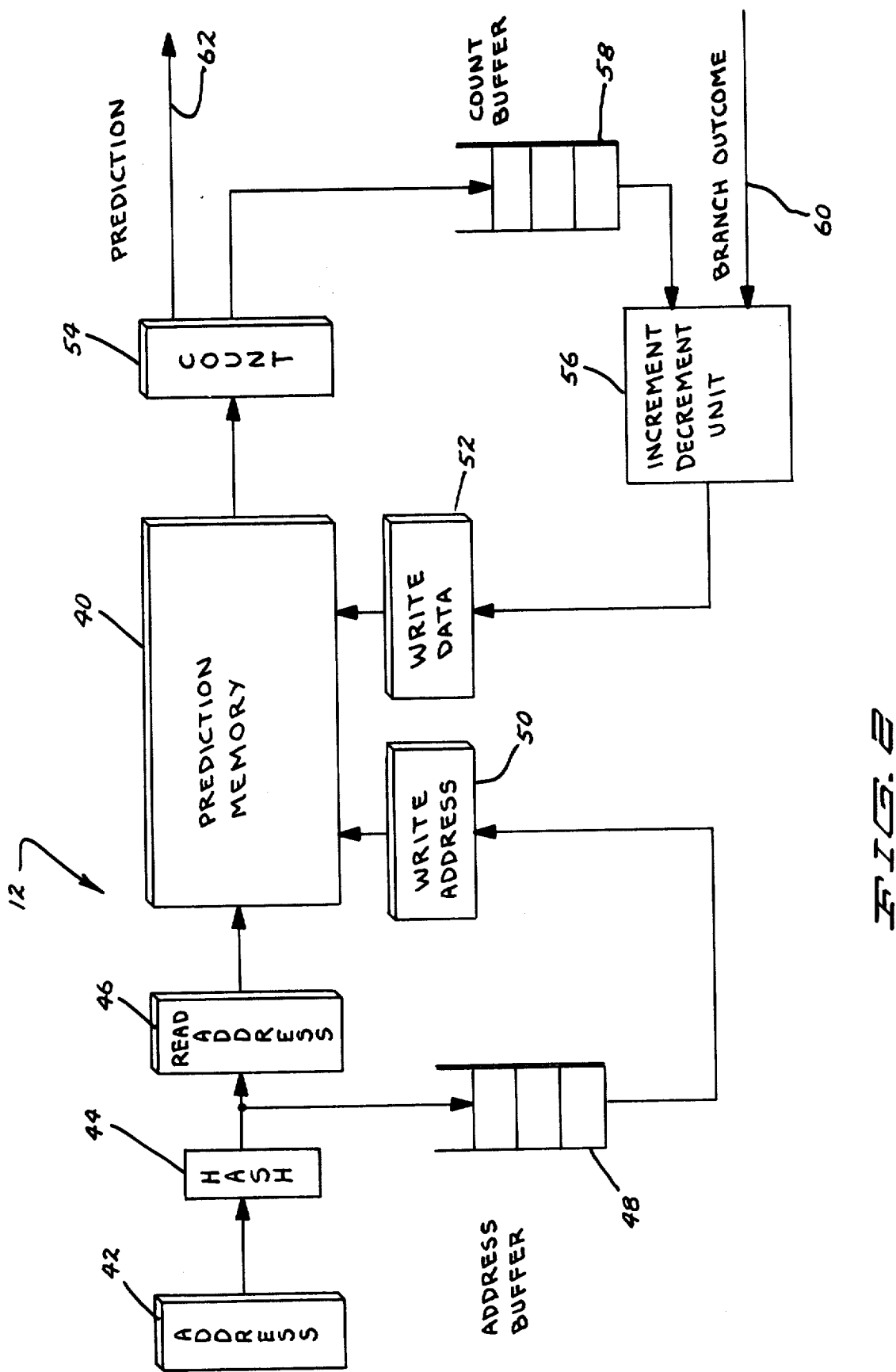
FIG. 2 is block diagram of a branch prediction system according to the present invention.

Referring now to FIG. 2, the branch predictor 12 according to the present invention contains a random access prediction memory 40 sometimes referred to as random access memory 40. The memory 40 contains the counts referred to in the section on the theory of operation of the present invention. The random access memory is addressed by a series of hash addresses prepared from the instruction addresses in the computer instruction pipeline. Memory 40 receives its input from a chain of devices which commences with an address register 42 for initially providing the instruction address. The hash network 44 operates to produce a hash address having considerably fewer bits that the instruction address. One appropriate way according to the preferred embodiment of this invention of preparing a hash address for memory 40 is to simply take the least significant bits of the instruction address and use that as the hash address. In the present case, a hash address of four bits is described. This hash address is provided to an address buffer 48 and to an address register 46 for addressing memory 40. The address buffer in turn furnishes a write address 50 which provides an input to memory 40. The output of memory 40 is a count used to create a conditional branch prediction as described in the theory of operation section. The prediction is provided to the computer system on output line 62. Also, the count register 54 provides the count to count buffer 58 which in turn, after buffering, is provided to an increment-decrement unit 56. At the appropriate time after the count is provided from count buffer 58 and the branch outcome information is returned on input branch outcome line 60, the increment-decrement unit increments or decrements the count in an appropriate way according to the theory of operation section of this application and provides a new count to the write data register 52. The write data register contains a buffered new count which is to be associated with the appropriate buffered write address contained in the write address register 50. This information is rewritten into the random access memory 40.

Referring now to FIG. 1, the branch predictor 12 takes the address of a branch instruction from address register 24 on line 20 and makes a prediction based on the past outcomes of the same instruction. This prediction is passed back to the instruction fetch control unit 14 on line 16 which begins instruction fetching from the predicted stream. Later, when the actual outcome of the instruction is known, this outcome is passed back to the branch predictor 12 on line 18 to generate a determining factor in making future branch predictions. The prediction of a branch outcome may be incorrect. It is possible to recover from an incorrect prediction by flushing instructions being processed in the pipeline from the incorrect instruction stream and by initiating a fetch and execution of instructions from the correct instruction stream.

Referring now to FIG. 2, the address of the branch prediction in register 42 may be hashed by the hash device 44 to a small number of bits. Typically, a range of four to ten bits would be appropriate. Four or six bits would be preferred. This hashing should be designed so that addresses are relatively close to each other map to different bit patterns. Using the low order four or six bits of the address does this quite satisfactorily. The hashed bit pattern from unit 44 becomes the address in address register 46 for the random access memory 40. This hashed bit pattern becomes latched in register 46 and becomes the address for memory 40. One preferred implementation would use a 64 word random access memory to correspond to a six bit hash address. Each word in the memory has a small number of bits which is interpreted as a count. The preferred implementation represents a two bit count in a 2's complement notation.

The addressed memory word is read out of the memory and is used to generate a prediction. If the count is not negative, the prediction is that the branch is taken. If the count is negative, the prediction is that the branch is not taken. In 2's complement notation in the preferred implementation, the sign bit of the count directly gives the prediction: 0 being a branch taken condition and a 1 being a branch not taken condition. The hashed address from unit 44 and the count are stored in first-in first-out buffers to await the actual branch outcome. The hash address is stored in address buffer 48 and the count is stored in count buffer 58. Later when the outcome arrives on line 60, the hashed address is removed from the buffer and placed in the prediction memory's write address register 50. The count is removed from its buffer 58 and is modified according to the actual branch outcome. If the branch was taken, then the count is incremented by 1, unless the count is already at the maximum value, in which case the count is unchanged. If the branch was not taken, the count is decremented by 1, unless it was already at a minimum value, in which case it is left unchanged. The updated count is written back into the memory. In the preferred implementation, the prediction memory can be both read and written at the same time. Commercially available RAMs allow this function.

What is claimed is:

1. A branch prediction mechanism comprising
a prediction memory,
an instruction address receiving means,
a hash address device connected to receive instruction addresses from said instruction address receiving means,
an address register connected with said prediction memory and to said hash address device for receiving hash addresses from said hash address device,
an address buffer connected to said hash address device for receiving hash addresses from said hash address device,
a write hash address register connected to said address buffer for receiving hash addresses from said address buffer and connected to said prediction memory,
a count register connected to said prediction memory for receiving the output from said prediction memory,
a count buffer connected to said count register for receiving output counts from said count register,
an increment-decrement unit connected to said count buffer for receiving input counts from said count buffer and having an input for receiving branch outcome information for updating the count according to the branch outcome,
a write data register connected to said increment-decrement unit for receiving the updated count information from said increment-decrement unit said write data register being connected to said prediction memory to provide updated count information corresponding to the hash address in said write hash address register, and
wherein said branch prediction device operates to predict branch instructions on a continuously updated history of recently executed branch instructions.

2. The mechanism of claim 1 in which said count register functions in 2's complement arithmetic and has a range comprising +1, 0, −1, and −2 and in which the branch is predicted to be taken for an address if the count is +1 or 0 and predicted to be not taken if the count is −1 or −2.

3. The mechanism of claim 2 in which the increment-decrement unit increments the count received from said count buffer by one if the branch is taken up to a limit of +1 and the unit decrements the count register by one if the branch is not taken down to a limit of −2.

4. The mechanism of either claim 2 or claim 3 in which the count register is initialized at a count of zero for each new hash address.

5. The mechanism of any one of claims 1, 2 or 3 in which said prediction memory is a random access memory having sixteen address locations and in which the output of said hash device is a four bit address.

* * * * *